June 30, 1942.  R. A. FUNK  2,288,348

WELDING EQUIPMENT

Filed June 10, 1940

*INVENTOR.*
RUSSELL A. FUNK
BY
*ATTORNEYS*

Patented June 30, 1942

2,288,348

UNITED STATES PATENT OFFICE 2,288,348

WELDING EQUIPMENT

Russell A. Funk, Pleasant Ridge, Mich.

Application June 10, 1940, Serial No. 339,822

3 Claims. (Cl. 219—4)

This invention relates generally to welding equipment and refers more particularly to improvements in the construction of the electrodes employed in welding devices operating on the resistance principle.

While electrodes of the general type forming the subject matter of this invention are not limited for use in welding any specific type of work, nevertheless, particularly satisfactory results are obtained in welding a terminal fitting of the general type shown and described in my copending application Serial No. 231,789, filed: September 26, 1938, since matured into Patent No. 2,255,553 dated Sept. 9, 1941, on one end of an electrical conductor. Terminal fittings of the type shown in the above application are adapted to have a snap-on engagement with a suitable socket member and the connection between the terminal fitting and the bare end of the electrical conductor must not only withstand an appreciable pull, but must also be such that the loss of electrical energy through the connection is reduced to the minimum. Considerable difficulty has been encountered in effecting a connection between the terminal fitting and electrical conductor possessing the above requirements and at the same time affording the snap-on engagement of the fitting with the socket. The problem of obtaining the desired connection, referred to above, is complicated by the fact that this connection must lend itself to large production manufacture and must be simple, as well as inexpensive.

It has been proposed to weld a terminal fitting on the bare end of an electrical conductor by the resistance method of welding, but prior attempts along this line failed to provide consistently satisfactory results in production and the required welding pressures frequently expanded or deformed the end of the fitting to such an extent as to preclude inserting the fitting in the socket provided therefor. Perhaps one reason why difficulty has been experienced in obtaining a satisfactory weld between the terminal fitting and bare end of an electrical conductor is the tendency for the welding current to be conducted by the cylindrical end of the fitting from one electrode to the other without passing through the wire extending into the terminal.

The present invention contemplates welding the cylindrical end of a terminal fitting to the bare end of an electrical conductor by the resistance method in such a manner that the fitting is not distorted during the welding operation to an extent precluding its ready insertion in a cooperating socket member and the resulting weld will withstand the required stress without destroying the electrical connection between the elements. In addition, the present invention renders it possible to obtain consistently satisfactory welds in a relatively short period of time and this is important in manufacturing electrical conductors equipped with terminal fittings on a production basis.

According to this invention, the desired results are obtained by the novel construction of the cooperating electrodes of the welder. As will be more fully hereinafter set forth, the tip of one electrode is constructed to cooperate with the tip of the other electrode to deform the cylindrical end of the terminal fitting therebetween and the latter electrode is provided with means for controlling the deformation of the terminal fitting so that the dimension of the terminal fitting is maintained within the limits required to permit readily inserting the terminal fitting into a cooperating socket member. By deforming the cylindrical end of the terminal fitting, the path of travel of the welding current from one electrode to the other is reduced in length and the bare ends of the wire in the fitting are pressed together to form a substantially homogeneous mass.

The foregoing, as well as other objects, will be made more apparent as this description proceeds, especially when considered in connection with the accompanying drawing, wherein.

Electrodes constructed in accordance with this invention are applicable to practically any welder operating on the resistance principle and since welders of this type are well known in the art, it is not believed necessary to illustrate in detail either the welder or its circuit. It will suffice to point out that welders operating on the resistance principle are usually provided with a pair of electrodes arranged in a circuit and supported for relative movement toward each other to clamp the work to be welded therebetween. The general arrangement is such that when the current in the circuit passes from one electrode to the other through the work, the latter is heated to the temperature required to effect the weld. The duration of the welding current and the interval the latter is applied in relation to the clamping pressure may, of course, be varied in dependence upon the character of the material to be welded.

Figure 1:
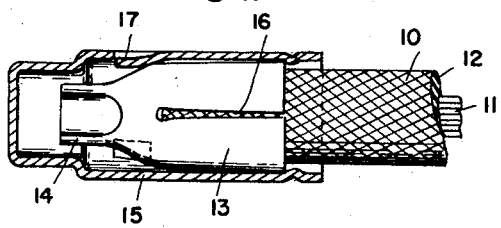
Figure 1 is an enlarged side elevational view, partly in section, of a terminal fitting welded on one end of an electrical conductor in accordance with this invention and showing the fitting in assembled relationship with a socket member.

Although it is not my intention to limit the present invention for use in welding any specific type of work, nevertheless, particularly satisfactory results have been obtained in welding terminal fittings on the ends of electrical conductors. Accordingly, I have illustrated in Figure 1 an electrical conductor 10 having a plurality of strands of wire 11 and having an insulating material 12 covering the strands. The insulating material 12 at one end of the electrical conductor is removed to expose the wire strands 11 and this end of the conductor is inserted into a terminal fitting 13 having a reduced portion 14 for receiving the bare ends of the strands 11.

The terminal fitting 13 is formed of a material having a relatively small resistance to the passage of electrical energy therethrough and is adapted to be telescoped into a suitable socket 15 which may be formed of the same material. The tubular body portion of the fitting, adjacent the reduced end 14, is provided with circumferentially spaced slots 16 extending longitudinally from the end of the body portion to a position adjacent the reduced portion 14. The inner diameter of the socket is somewhat less than the outside diameter of the body portion of the fitting so that when the latter is telescoped into the former, the slotted portions of the terminal body flex inwardly slightly and provide an effective electrical contact between the parts. Also, if desired, the socket may be formed with circumferentially spaced depressions 17 positioned to engage the inner end of the terminal fitting and resist disengagement of the latter from the socket. The depressions 17 in the socket engage the slotted portions of the terminal and flex the latter inwardly slightly as the terminal is telescoped into the socket. When the terminal fitting is positioned in the socket beyond the depressed portions 17, the slotted portions of the terminal fitting spring outwardly and cooperate with the depressed portions to resist disengagement of the terminal fitting from the socket.

In constructions of the above type, it is highly important to securely fasten the reduced end 14 of the terminal fitting to the bare ends of the wire strands of the electrical conductor. In the present instance, the reduced end 14 of the terminal fitting is welded to the bare ends of the wire strands by resistance welding equipment embodying electrodes of the construction shown in Figures 2 to 4, inclusive.

Figure 2:
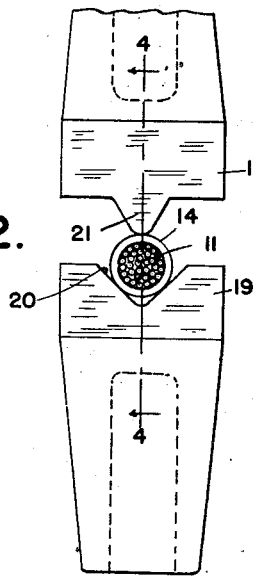
Figure 2 is an enlarged side elevational view of a pair of cooperating electrodes constructed in accordance with this invention and showing the electrodes in the positions the latter assume just prior to clamping a terminal fitting therebetween.
Figure 3:
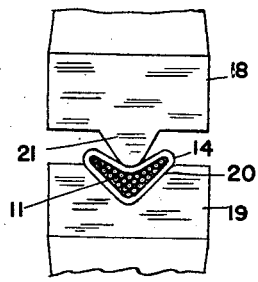
Figure 3 is a view similar to Figure 2 showing the electrodes in the positions they assume when the terminal fitting is clamped therebetween.
Figure 4:
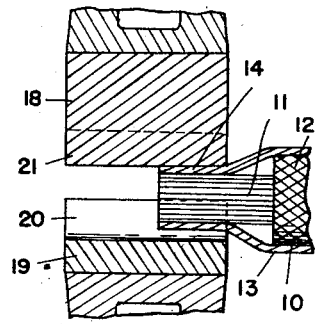
Figure 4 is a sectional view taken substantially on the plane indicated by the line 4—4 of Figure 2.

As shown in Figures 2 to 4, inclusive, the electrodes are provided with relatively hard tips 18 and 19, respectively. The tip 19 is formed with a substantially V-shaped groove 20 therein having a dimension sufficient to receive a part of the reduced end 14 of the terminal fitting and to position the latter with respect to the tip 19. The tip 18 on the cooperating electrode is formed with a projection 21 in alignment with the groove 20 and having a substantially V-shaped cross sectional area.

As the electrodes are relatively moved toward each other to the positions shown in Figure 3, the projection 21 deforms the reduced end 14 of the terminal fitting and fashions a substantially V-shaped groove in the latter. In forming this groove, the various strands of wire are pressed together to such an extent that these strands and the reduced portion of the terminal fitting form a substantially homogeneous mass. Also, with this construction, the distance between the surfaces of the projection 21 and the surfaces of the groove 20 is reduced to such an extent that the welding current flows directly from one electrode to the other through the wire strands instead of being conducted around the ends of the wire strands by the reduced portion 14 of the terminal fitting. It may also be pointed out at this time that the efficiency of the weld may further be increased by coating the wire strands with a material having a relatively higher resistance to the passage of current. This results in obtaining a higher temperature and insures an effective bond between the wire strands and terminal fitting.

Figure 5:
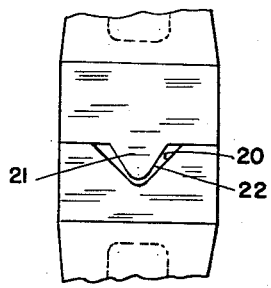
Figure 5 is an elevational view through a pair of electrodes constructed in accordance with this invention and showing the electrodes in abutting engagement with one another.

It will also be noted from Figure 2 that the included angle between the adjacent sides of the projection 21 is less than the included angle between the adjacent sides of the groove 20. As a result, when the electrodes are relatively moved into clamping engagement with the work, deformation of the end 14 of the terminal fitting is controlled and the minimum lateral spreading of the end 14 of the terminal fitting is obtained. By controlling the deformation of the end 14 of the terminal fitting and predetermining the relative sizes of the projection 21 and groove 20, the width of the welded end 14 of the terminal fitting may be accurately maintained less than the diameter of the socket 15 within which the terminal fitting is engaged. It may also be pointed out at this time that the dimension of the projection 21 is carefully predetermined with respect to the dimension of the groove 20 to insure a clearance between the surfaces of the projection 21 and the adjacent surfaces of the groove 20 in the event the welder is accidentally operated without first positioning the work between the electrodes. This clearance is designated in Figure 5 by the reference character 22 and it will be observed from this figure that the surfaces of the electrodes adjacent the projection and groove contact with one another so that the welding current passes from one electrode to the other without flowing through the projection. As a result, this welding current will not burn or otherwise harm the projection 21.

What I claim as my invention is:

1. In welding equipment, a pair of cooperating electrodes relatively movable toward and away from each other to clamp the work to be welded therebetween, a tip on one of the electrodes having a groove substantially V-shaped in cross section and adapted to receive the work to be welded, and a tip on the other electrode having a substantially V-shaped projection in alignment with the groove and engageable with the work to deform the latter.

2. In a method of welding strands of wire to a terminal fitting having a tubular portion for receiving the strands of wire, the steps which consist in inserting the strands of wire into the tubular fitting, positioning the tubular fitting with the strands of wire therein between relatively movable welding electrodes respectively having a recess for receiving the terminal fitting and having a projection registering with the recess, and relatively moving the electrodes toward each other to engage the projection with the terminal fitting and deform the latter sufficiently to press the strands of wire into a homogeneous mass in the fitting and thereby reduce the resistance to the passage of electrical current from one electrode to the other through the terminal fitting and strands of wire.

3. In a method of welding strands of wire to a tubular terminal fitting, the steps which comprise inserting the strands of wire into the tubular fitting, deforming the tubular fitting sufficiently to press the wires therein into a homogeneous mass by compressing the tubular fitting with the wire strands therein between a pair of welding electrodes, confining the deformation of the fitting during the compressing operation to a predetermined contour, and passing sufficient electrical current from one electrode to the other through the fitting and the wire strands in said fitting to weld said strands to the fitting.

RUSSELL A. FUNK.